UNITED STATES PATENT OFFICE.

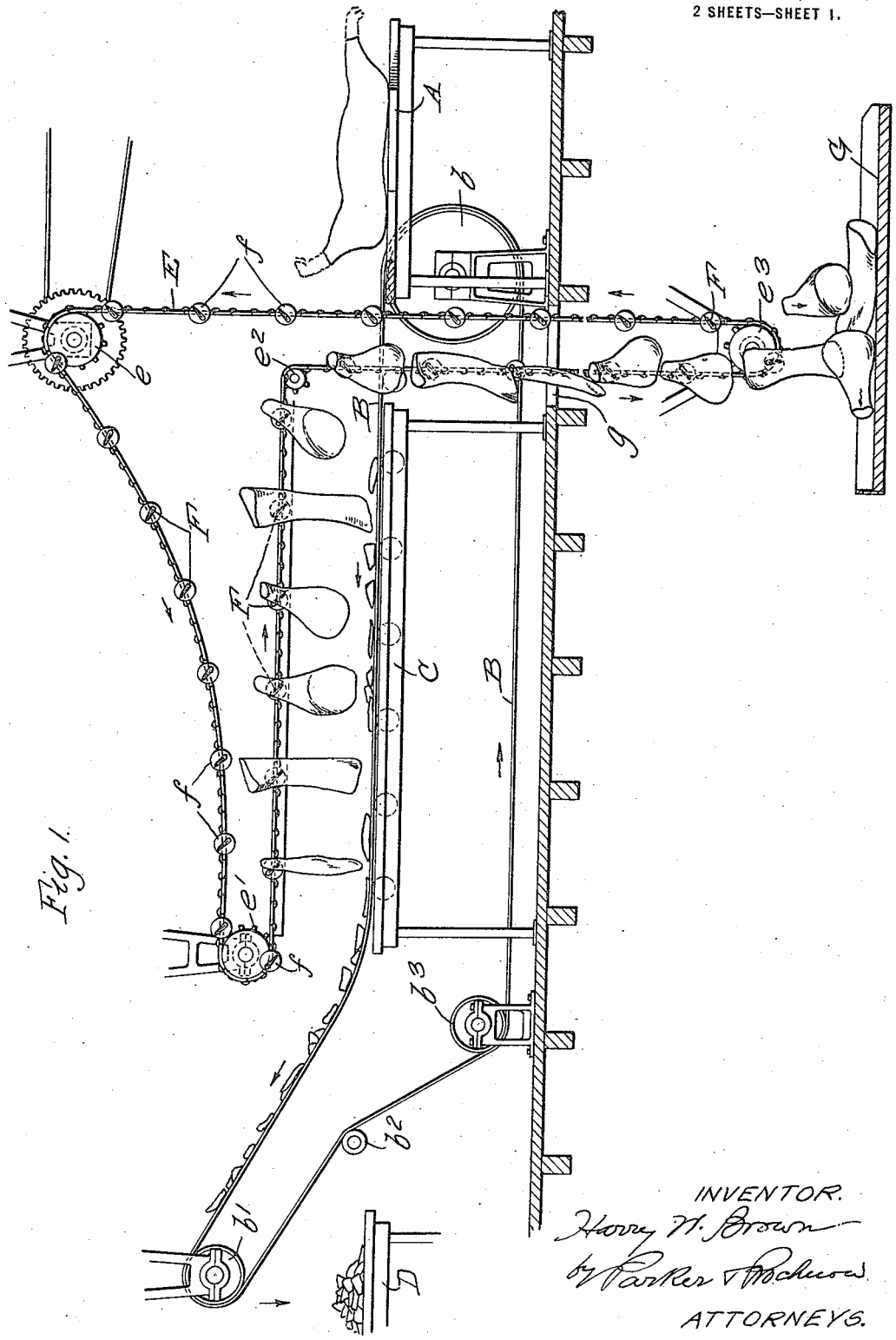

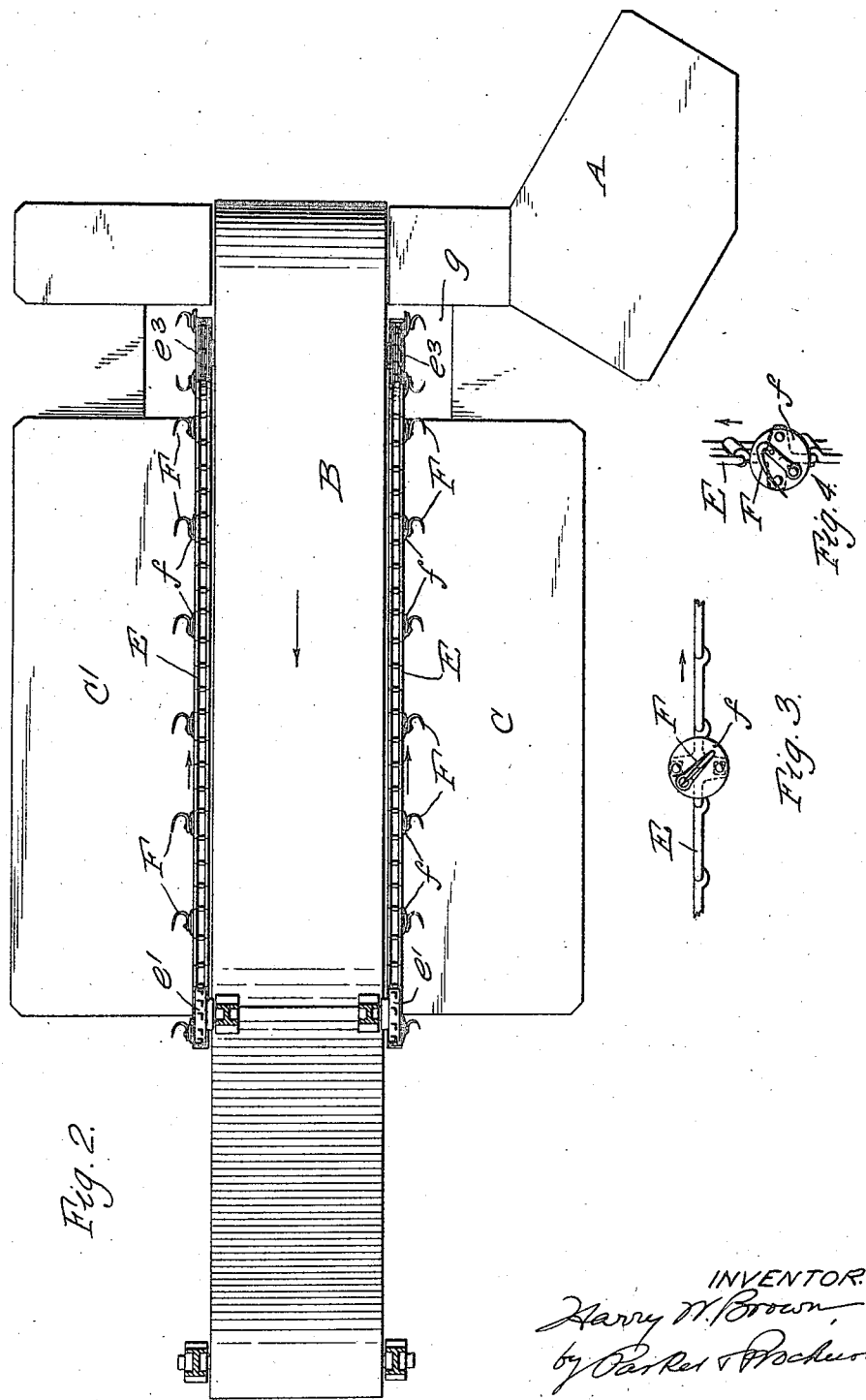

HARRY W. BROWN, OF BUFFALO, NEW YORK.

MEAT-HANDLING APPARATUS.

1,416,443.  Specification of Letters Patent.  Patented May 16, 1922.

Application filed March 3, 1922. Serial No. 540,825.

*To all whom it may concern:*

Be it known that I, HARRY W. BROWN, a citizen of the United States, residing at Buffalo, in the county of Erie and State of New York, have invented a new and useful Improvement in Meat-Handling Apparatus, of which the following is a specification.

This invention relates to apparatus for use in handling meat, and particularly in cutting up carcasses into their several parts and for conveying the various parts to the desired destinations.

In the cutting up of carcasses and preparing of meat for the market or for packing, there is much time wasted in large establishments due to the fact that the carcasses to be cut up are not supplied to the operatives in such a manner as to be readily accessible to them, and the parts which have been cut are not carried away in such a manner as to enable the operatives to work efficiently.

The objects of this invention are to provide an apparatus by means of which carcasses or parts to be cut are supplied to operatives and the cut parts are removed and conveyed to their destinations in such a manner as to enable the operatives to work at greater efficiency; also to provide an apparatus of this kind which is designed to convey the cut parts to another floor in a building, if desired; also to provide an apparatus of this kind with hooks arranged on an endless chain in such a manner that the cut parts may easily be secured to the hooks and carried to the desired destination and then to be automatically dropped from the hooks; also to improve apparatus of this kind in other respects hereinafter specified.

In the accompanying drawings:

Fig. 1 is a side elevation of a meat handling apparatus embodying the invention.

Fig. 2 is a top plan view thereof.

Fig. 3 is a fragmentary elevation on an enlarged scale of a conveyor chain showing one of the hooks for receiving the cut parts and automatically dropping the parts when the same arrive at their destination.

Fig. 4 is a perspective view thereof showing the hook in a position to drop the parts supported thereon.

The apparatus is primarily intended for use in connection with the cutting up of hog carcasses although the apparatus may be used to operate on carcasses of other animals. These carcasses are generally brought to the apparatus cut in halves, and, briefly stated, the apparatus comprises a preliminary cutting table on which the half carcasses may be cut into a number of parts which are then placed upon a conveyor which passes between a pair of final cutting or trimming tables. The operatives stand at the tables and take certain parts of the carcass from the conveyor and perform the necessary operations thereon such as trimming or further cutting of the parts into smaller pieces. The cut parts are then placed on another conveyor or chain which for this purpose is preferably provided with hooks or other means for receiving the cut parts, and the trimmings or other parts are placed on the first mentioned conveyor, the two conveyors carrying the parts placed thereon to different destinations, where they are dropped for such further operations as may be necessary thereon. The conveyor for the cut parts is preferably arranged above the tables at a suitable height so that the hooks thereon can be readily reached and no time is lost by the operatives in taking the meat from the first conveyor, performing the operation thereon and again placing the parts either on the conveyor chain or upon the first mentioned conveyor.

In the apparatus embodying the invention which has been illustrated in the accompanying drawings, A represents a preliminary cutting table on which the half carcasses are received. While resting on this table certain operations are performed on the carcass, such for example as cutting off the feet and cutting the carcass into several different portions. These portions of the carcass are then placed upon a conveyor B which, in the construction shown, is in the form of a belt and is wide enough to easily support any of the parts to be placed thereon. This belt, in the construction shown, passes over a pulley $b$ arranged at the receiving end of the belt, and a pulley $b'$ over which the belt passes to drop the materials carried thereby. The belt also passes over idler rollers $b^2$ and $b^3$, and means of any suitable kind (not shown) may be employed for guiding the portion of the belt which carries the parts of carcasses.

At each side of the belt are arranged suitable tables C and C' between which the belt passes, the horizontal run of the belt which passes between the tables being preferably arranged at about the same elevation as the tables so that operatives working at the tables can readily pull a part of a carcass from the belt onto the table and perform the necessary operation on the part while resting on the table. The trimmings, which are cut from the hams, loins, shoulders, or other parts, are again placed on the belt and are carried to the discharge end thereof from where they may be dropped on a suitable table D for sorting or other operations.

The hams, shoulders, loins and other cuts or parts are usually carried to another floor or another part of the building and for this purpose, in the construction shown, a pair of conveyors, such for example as chains E, is provided, each conveyor chain being arranged so that a run thereof will be within convenient reach of all the operatives working at the cutting tables C. This run may, for example, be adjacent to the inner edge of each table, and the conveyor chains are provided with suitable means for supporting the pieces therefrom. In the construction shown for this purpose, the conveyor chains are provided at intervals with hooks F having sharp points on which the pieces can be readily secured. These conveyor chains, in the construction shown, are arranged to convey the pieces to a lower floor and to automatically drop the same upon a table or other support. The two vertical runs of the conveyor chains consequently pass through a hole $g$ in the floor which supports the apparatus. Means other than hooks can be provided on the conveyor chains, if desired, for carrying the pieces to their destinations.

The conveyor chains, in the construction shown, pass over a plurality of sprocket wheels $e$ $e'$ $e^2$ $e^3$, the sprocket wheels $e'$ and $e^2$ being arranged to cause a run of each chain to pass above a cutting or trimming table C and the conveyor chain after passing over the sprocket wheel or pulley $e^2$ passes downwardly to a lower floor, where in passing around the sprocket $e^3$ the pieces are dropped from the hooks F and deposited upon a suitable support G. In the construction shown, both chains drop the meat on the same support G, but if it is desired, the two chains may lead to different destinations.

The hooks F may be mounted on the chain in any desired manner, those shown being mounted on plates or hook-supporting parts $f$ suitably secured to links of the chain B and the hooks are preferably arranged at an angle of approximately 45° with reference to the length of the chain. By suitably arranging the hooks in this manner, they are adapted to receive the pieces while on the horizontal runs of the chain, on which run the hooks incline in one direction, and after passing from the horizontal run of the conveyor chain to a vertical run thereof the hooks are turned in such a manner that they still support the pieces placed thereon. After the chain passes around a sprocket wheel such as illustrated at $e^3$, these hooks are inverted so that the points thereof extend downwardly, causing the hooks to disengage the pieces of meat and to drop them on the support G. Hooks or meat-receiving devices of other suitable construction may be used for this purpose.

The apparatus is very efficient in operation since by means of the relative arrangement of parts, the parts of the carcasses to be cut are delivered to the apparatus in such a manner that it is only necessary for an operative to reach out and remove from the belt B the part of the carcass upon which he is to operate. After cutting a piece from this part of the carcass, he passes the remainder of the part to the operative next to him or replaces the same on the belt and in trimming the part which he has cut, the trimmings are placed on the belt B and the trimmed part is placed on a hook of the conveyor chain which is readily accessible to the operative. This conveyor chain not only saves the necessity of providing an elevator for raising or lowering the cut pieces to the desired floor, but also carries away the pieces as soon as the trimming thereof is completed, so that there is no accumulation of cut pieces in a truck, barrel or other container which requires removal and consequent delay in the work of cutting up carcasses. The various operatives at the table C each operate on a certain definite part of the carcass so that one conveyor chain receives certain pieces or cuts while the other chain receives other pieces. Further sorting of the cut pieces can be accomplished after they are dropped from the conveyor chain. The traveling belt B has the two-fold purpose of conveying the pieces of carcass to the operatives at the cutting tables and also of removing the trimmings. The apparatus can readily be cleaned so that the same is sanitary and the parts are so arranged that very little power is required to drive the movable parts of the apparatus.

I claim as my invention:

1. An apparatus for use in the cutting up of carcasses, including a preliminary cutting table, a traveling conveyor having a substantially horizontal run which extends into proximity to said table and which is adapted to receive parts of carcass from said table final cutting tables placed at opposite sides of the horizontal run of said conveyor, and conveyors having runs arranged adjacent to said final cutting tables and adapted to receive the finished parts and convey the same to their destinations.

2. An apparatus for use in cutting up carcasses, including a traveling conveyor having a substantially horizontal run adapted to receive parts of carcasses, cutting tables arranged at opposite sides of said horizontal run and to which said parts may be transferred from said conveyor, and conveyors arranged in operative relation to said tables and adapted to receive the cut parts and convey the same to their destinations.

3. An apparatus for use in cutting up carcasses, including a pair of cutting tables spaced apart, a conveyor having a substantially horizontal run passing between said tables for carrying parts of carcasses to said tables and adapted to receive trimmings to carry the same to their destinations, and conveyors arranged above said first-mentioned conveyors and adapted to receive cut parts and carry the same to their destinations.

4. An apparatus for use in cutting up carcasses, including a pair of cutting tables spaced apart, a conveyor having a substantially horizontal run passing between said tables for carrying parts of carcasses to said tables and adapted to receive trimmings, said conveyor having a portion which extends beyond said cutting tables and which is adapted to drop said trimmings, and conveyors arranged in operative relation to said tables and adapted to receive cut parts and carry the same to their destination.

5. An apparatus for use in cutting up carcasses, including a pair of cutting tables spaced apart, a conveyor having a substantially horizontal run passing between said tables for carrying parts of carcasses to said tables and adapted to receive trimmings, and a conveyor having a substantially horizontal run arranged in operative relation to said tables and adapted to receive the cut parts, said conveyor also having a substantially upright run for carrying said cut parts to another floor without releasing said parts.

6. An apparatus for use in cutting up carcasses, including a cutting table, a conveyor having a horizontal run arranged at one edge of said table approximately level therewith and adapted to carry parts of carcasses to different portions of said table, and a second conveyor having a substantially horizontal run arranged in operative relation to said table to receive the cut parts and having a substantially upright run for carrying said cut parts to another floor.

7. An apparatus for use in cutting up carcasses, including a cutting table and a conveyor having a substantially horizontal run arranged in operative relation to said cutting table, and having parts adapted to receive cut pieces of carcasses and to carry the same to a destination located at a distance from said table, said parts of the conveyor being adapted to drop the cut pieces when the same arrive at their destinations.

8. An apparatus for use in cutting up carcasses, including a cutting table, a conveyor having a substantially horizontal run arranged in operative relation to said cutting table, and supporting devices arranged on said conveyor and adapted to carry cut parts to a destination, said conveyor passing around a guide device at said destination and changing the positions of said supporting devices so as to cause the same to drop said cut parts.

9. An apparatus for use in cutting up carcasses, including a conveyor chain having a substantially horizontal run, supporting devices arranged on said chain and adapted to support cut parts for carrying the same to a destination, and a sprocket wheel at said destination around which said chain passes and which changes the position of said supporting devices in such a manner as to cause the same to drop said cut parts.

10. An apparatus for use in cutting up carcasses, including a conveyor chain having a substantially horizontal run, hooks arranged on said chain and adapted to receive cut parts of said carcasses, and a sprocket wheel about which said chain passes and which causes said hooks to be moved into positions to drop said cut parts.

11. An apparatus for use in cutting up carcasses, including a conveyor chain having a substantially horizontal run, hooks arranged on said chain and extending at an angle to the length of the chain, said chain having a substantially upright run for carrying the cut parts to another floor, the angle of said hooks being such as to enable the same to support the cut pieces on said horizontal and said upright runs, and means for changing the direction of movement of the chain at the end of said upright run to cause said hooks to be inverted for discharging the cut parts.

12. An apparatus for use in cutting up carcasses, including a pair of cutting tables spaced apart, a conveyor belt having a substantially horizontal run passing between said tables for carrying parts of carcasses into operative relation to said tables, a pair of conveyor chains arranged at opposite sides of said belt and having a horizontal run arranged in operative relation to said tables and a substantially upright run, supporting devices on said chains for cut parts, said supporting devices being arranged to support the cut parts on said horizontal and upright runs of said chains, and means for changing the direction of said conveyor chains at the ends of said upright runs to cause said supporting devices to drop said cut parts.

HARRY W. BROWN.